United States Patent [19]

Smith

[11] Patent Number: 5,318,272
[45] Date of Patent: Jun. 7, 1994

[54] MOTOR CONTROLLED THROTTLING POPPET VALVE

[75] Inventor: Ian S. R. Smith, Boulder, Colo.

[73] Assignee: MKS Instruments, Inc., Andover, Mass.

[21] Appl. No.: 896,844

[22] Filed: Jun. 12, 1992

[51] Int. Cl.$^5$ .............................................. F16K 31/02
[52] U.S. Cl. ........................ 251/129.12; 251/129.11; 251/335.3; 251/186
[58] Field of Search ........... 251/335.3, 129.11, 129.12, 251/176, 186

[56] References Cited

U.S. PATENT DOCUMENTS

| | | | |
|---|---|---|---|
| 2,331,503 | 10/1943 | Ray | 251/335.3 |
| 4,184,333 | 1/1980 | Blaha et al. | 91/532 |
| 4,412,517 | 11/1983 | Kobashi et al. | 251/129.11 |
| 4,815,699 | 3/1989 | Mueller | 251/335.3 |
| 4,832,311 | 5/1989 | Kimura | 251/129.11 |

*Primary Examiner*—A. Michael Chambers
*Attorney, Agent, or Firm*—Sixbey, Friedman, Leedom & Ferguson

[57] ABSTRACT

A motor controlled poppet valve is provided of the type including a valve body, a valve seat mounted at one end of the valve body, and a valve element that comprises a threaded shaft having one end engaged to a nut driven by a stepper motor, and a free end reciprocably moveable into a valve opening or a valve closing position, wherein the free end of the shaft assumes a substantially nonvarying distance from the drive nut or the stepper motor when moved into the valve closing position, and a resilient linkage assembly including a constant force spring that interconnects the free end of the shaft with the valve element. The resilient linkage forcibly depresses the valve element into the valve seat when the shaft is moved into the valve closing position with a force that remains substantially constant regardless of variations in the distance between the free end of the shaft and the valve closing position due to thermal expansion and contraction of the valve body. Additionally, the extreme control of the extent to which the valve element is moved toward the valve seat afforded by the combination of the stepper motor and threaded shaft allows the poppet valve to perform not only a gas isolation function, but throttling and soft start functions as well, thereby obviating the need for separate throttling or soft start valves in a vacuum system.

21 Claims, 3 Drawing Sheets

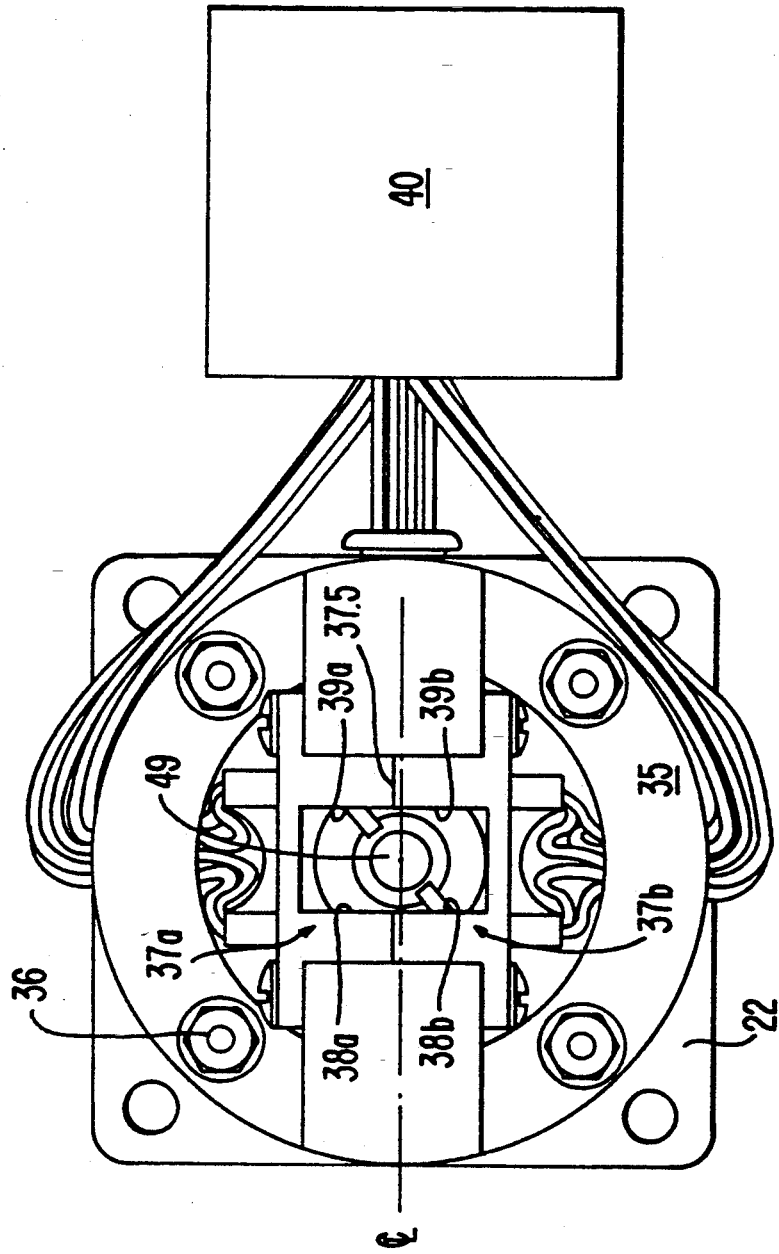

MOTOR CONTROLLED THROTTLING POPPET VALVE

BACKGROUND OF THE INVENTION

This invention generally relates to poppet valves, and is specifically concerned with a stepper motor controlled valve having a resilient linkage assembly for depressing the valve element into the valve seat with a constant force regardless of variations in the distance between the valve element and valve seat caused, for example, by thermal expansion or contraction of the valve body. The poppet valve of the invention advantageously provides not only positive shut-off, but throttling and soft-start capabilities as well.

Control valves for the precision regulation of gas flows and maintenance of vacuum and near-vacuum conditions are well known in the prior art. Such control valves are used, for example, in devices for manufacturing semiconductor components and integrated circuits on silicon chips. In such applications, three different types of control valves are frequently necessary, including a shut-off valve for positively isolating the vacuum system for the ambient atmosphere, a throttling valve for modulating a flow of gas from one part of the system to another, and a soft-start bypass valve for facilitating slow pump-downs from atmospheric pressures to minimize turbulence and particle disturbance within the vacuum system. The ability to positively isolate the vacuum system from the ambient atmosphere is a necessary precondition if vacuum or low pressure integrity is to be maintained. The ability to precision modulate a flow of gas in such systems is particularly important in the implementation of manufacturing processes such as chemical vapor deposition, sputtering, and ECR deposition. The ability to implement slow pump-downs in such systems is also important, as a turbulent flow of gas through the valve can cause the dislodgement of particulate matter in the system onto the silicon chips, thereby spoiling the final product.

Thus far, no one single valve structure has been discovered which can satisfactorily perform all three functions of positive isolation, gas throttling, and soft-start capabilities. While prior art poppet-type valves are capable of providing excellent isolation between the vacuum system and the ambient atmosphere, they are not capable of providing the type of precision throttling and soft-start capabilities required in such systems, largely due to the fact that once the valve element is withdrawn a short distance from the valve seat, such valves instantly become highly conductive to gas flow. While it is conceivable that improved throttling characteristics might be obtained with improved distance control between the valve element and the valve seat, the required degree of the precision control of such small distances has in the past been rendered near impossible due to the dimensional changes of the valve body and valve stem due to thermal expansion or contraction as heated gases flow through the bodies of such valves. Specifically, the applicant has observed that when the body of the valve is heated (as may be done to prevent the condensation of silicon nitride out of a gas during a flow forming process) such heat typically does not raise the temperature of the valve stem at the same rate as the valve body due to the isolating bellows which typically circumscribes and contains the valve stem in such valves. The resulting thermal differential expansion of the valve body relative to the valve stem can not only alter the flow characteristics of such valves; it can (under certain conditions) actually jeopardize the integrity of the positive seal desired when such valves are used solely for isolation purposes.

While other types of prior art control valves are known which are capable of providing adequate throttling characteristics, such valve designs (which may include, for example, butterfly-type valves, vane valves, gate valves or angle valves) typically employ wiping seals whose outer surfaces continually wear down with use. The wearing down of these seals continually changes the flow characteristics of these valves, which must be compensated for by either the use of relatively expensive control mechanisms or the constant adjustment of a simpler control mechanism by the operator of the valve. In many cases, wiping the seal against contamination renders the seal useless as a vacuum seal.

Clearly, there is a need for a single type of valve which is capable of performing all three functions of positive shutoff, throttling, and soft-start in order to obviate the need for three separate kinds of valves in such vacuum systems. Ideally, such a valve should be simple in construction and controllable by means of relatively simple and inexpensive control circuits. Finally, it would be desirable if such a valve did not employ wiping seals so that all of the problems associated with the wearing down of such seals over time would be avoided or at least minimized.

SUMMARY OF THE INVENTION

Generally speaking, the invention is a motor controlled poppet valve that overcomes or at least ameliorates all of the aforementioned disadvantages associated with prior art poppet valves. The poppet valve of the invention is of the type that includes a motor, a valve body, a valve seat, and a valve element, and comprises a shaft driven by a motor and having a free end reciprocably movable into either a valve closing or a valve opening position, wherein the free end of the shaft assumes a substantially nonvarying distance from the motor in the valve closing position, and a resilient linkage assembly that interconnects the free end of the shaft with the valve element while forcibly depressing the valve element in seating engagement with the valve seat when the shaft is moved into the valve closing position with a force that remains substantially constant regardless of variations in the distance between the free end of the shaft and the valve seat which may be cause, for example, by thermal differential expansion of the valve body.

In the preferred embodiment, the resilient linkage assembly includes a constant force spring for providing the constant depressing force, as well as a spring retainer which maintains the spring in a precompressed state. The spring retainer also advantageously defines the stroke of the constant force spring to be a relatively small distance which is only a little larger than the maximum expected variation in the distance between the free end of the shaft and the valve seat caused by thermal differential expansion. The precompression of the spring retainer, in combination with the relatively short stroke that the spring retainer defines, helps to enhance the linearity of the constant force characteristics of the spring used in the resilient linkage.

The shaft of the poppet valve is preferably threaded, and is further preferably driven by a nut that is rotated by a stepper motor. Moreover, the particular thread employed on the shaft preferably has a relatively fine pitch, and profile which creates a relatively substantial frictional engagement with the nut driven by the stepper motor such that most of the torque generated by the stepper motor is employed in overcoming the frictional forces between the drive nut and the threaded shaft. The fact that the amount of rotation of the stepper motor may be precisely controlled by regulating the number of pulses supplied to its power input (i.e., 400 pulses per revolution) in combination with the relatively fine pitch of the thread of the shaft (i.e., 0.062 inches per revolution) provides the operator of the valve with the means to precisely control the extent to which the threaded shaft extends or retracts the valve element (i.e., in increments as small as 0.000155 inches). Additionally, the relatively high frictional forces present in the interface between the drive nut and the threaded shaft advantageously prevent unwanted backdrive from occurring between the shaft and the nut when the stepper motor is deactuated, and the valve element is applying a reactive compressive force on the threaded shaft.

The motor controlled poppet valve preferably further comprises a bellows which is connected between the upper part of the valve element and an upper wall of the valve body that completely encloses the resilient linkage assembly of the valve. The bellows not only advantageously isolates the resilient linkage assembly from the gases or other fluids which may flow through the valve body; it also advantageously applies, as a result of either mechanical or pneumatic forces, a biasing force between the drive nut of the stepper motor and the threads of the shaft which advantageously prevents backlash from occurring between the nut and shaft. This anti-backlash feature insures that a given incremental rotation of the drive nut will result in a given linear translation of the shaft.

The valve element of the poppet valve includes not only an O ring or similar resilient valve member, but also includes an additional valving member that advantageously provides throttling and soft pump capabilities for the valve. In the preferred embodiment, this additional valve element is a cylindrical protrusion disposed around the O ring which is substantially complementary in shape and received by a cylindrical wall in the valve seat. The outer diameter of the cylindrical protrusion of the valve element and the inner diameter of the cylindrical wall of the valve seat are spaced apart to form a thin annular space whose height varies with the extent that the protrusion is inserted into or withdrawn from the valve seat. As the amount of gas flow through the valve body is directly dependent upon the height of this thin annular space, and as this height can be controlled with extreme precision by the combination of the stepper motor and threaded shaft, the valve is easily capable of precision throttling operations as well as soft pump capabilities when used in slow start vacuum applications.

BRIEF DESCRIPTION OF THE SEVERAL FIGURES

FIG. 4 illustrates the configuration of the opto-interrupters which control the stepper motor of the valve.

DETAILED DESCRIPTION OF THE PREFERRED EMBODIMENT

Figure 1:
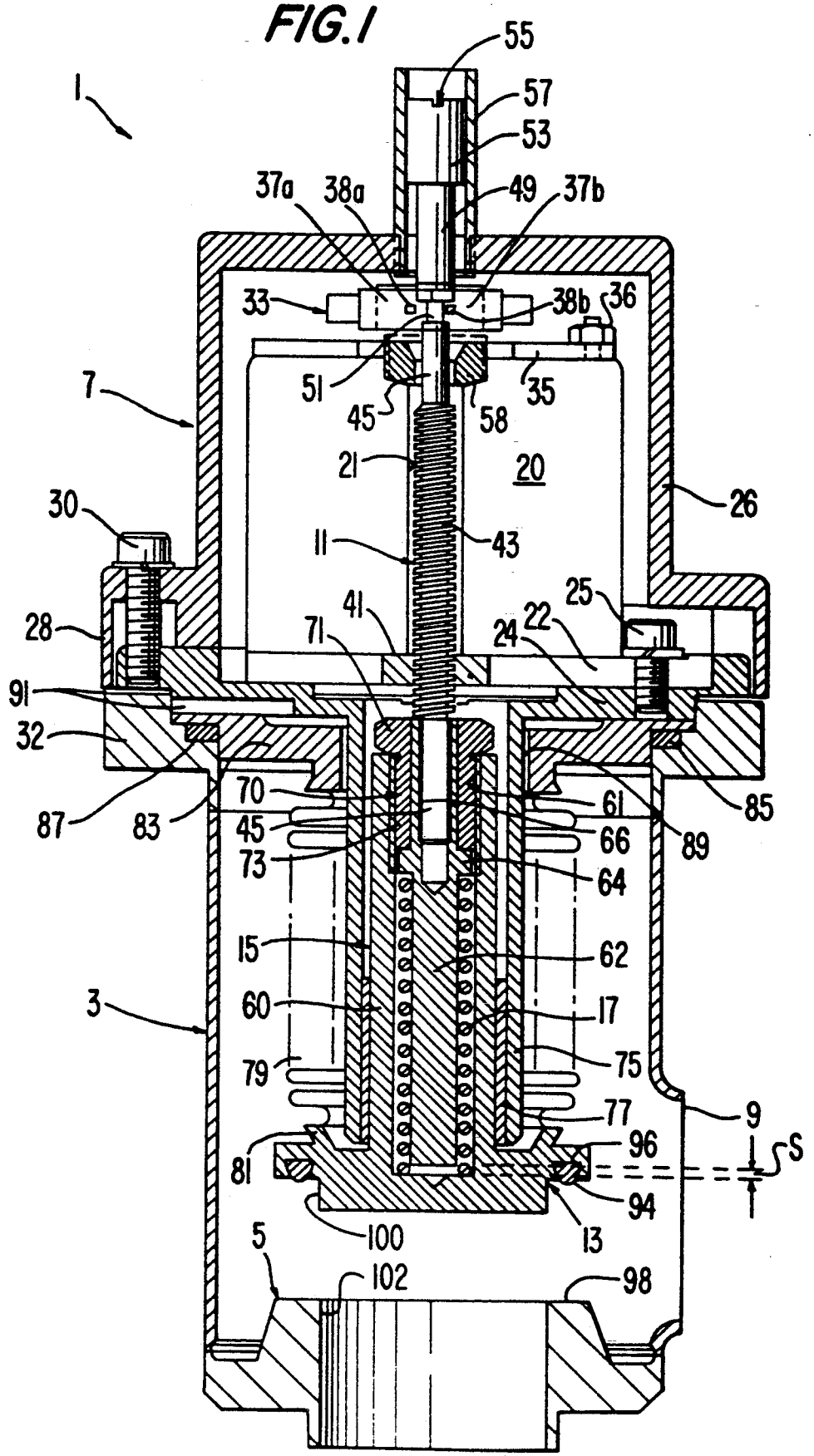
FIG. 1 is a cross-sectional side view of a preferred embodiment of the throttling poppet valve of the invention, illustrating the valve in an open state.

With reference now to FIG. 1, a preferred embodiment of the motor controlled throttling poppet valve 1 of the invention includes a cylindrical valve body 3 having a valve seat 5 mounted at its lower end and a stepper motor assembly 7 mounted over its upper end. The valve body 3 may be formed from stainless steel. The valve body further includes an outlet port 9 on its side for conducting a flow of a fluid such as a low pressure gas. Centrally disposed within the valve body 3 is a threaded shaft 11 which reciprocably moves a valve element 13 into sealing engagement and disengagement with the valve seat 5. A resilient linkage assembly 15 having a constant force spring 17 interconnects the lower end of the threaded shaft 11 with the valve element 13. This assembly 15 functions to forcibly depress the valve element 13 against the valve seat 5 when the threaded shaft 11 is moved into a valve closing position with substantially the same force regardless of variations in the distance between the free end of the shaft 11 and the valve seat 5 which may occur, for example, as the result of thermal expansion or contraction of the metal forming the cylindrical valve body 3.

The stepper motor assembly 7 includes a nut driving stepper motor which may be, for example, a model number LA23, LA34 or LA42 stepper motor manufactured by Eastern Air Devices located in Dover, N.H. Preferably, the motor 20 is calibrated to rotate one time upon the receipt of 400 power pulses. The stepper motor 20 includes a centrally disposed bore 21 for conducting the threaded shaft 11, and a front flange 22 which is attached to a motor mounting plate 24 by means of a bolt 25. The stepper motor 20 is contained within a cylindrically shaped motor housing 26 having a front mounting flange 28. This mounting flange 28 is secured an upper flange 32 that circumscribes the valve body 3 by means of a plurality of bolts 30, only one of which is shown.

With reference now to FIGS. 1 and 4, the motor housing 26 contains an opto-interrupter assembly 33 which is mounted on the top end of the stopper motor 20 by means of a nut and stud 36. The opto-interrupter assembly 33 includes a pair of opto-interrupters 37a,b which are mechanically mounted in parallel as shown in order to minimize the amount of vertical space that the opto-interrupter assembly 33 requires within the upper end of the motor housing 26. Each of the opto-interrupters 37a,b includes an LED window 38a,b and a phototransistor window 39a,b respectively. In both cases, the LED windows 38a,b transmit light from a light-emitting diode contained within its respective opto-interrupter, while the phototransistor window 39a,b will normally receive the light emitted by this LED unless the optical path between the two windows 38a, 39a or 38b, 39b is blocked. In the preferred embodiment, each of the opto-interrupters 37a may be a model number OPB901W55 manufactured by Optek located in Carrollton, Tex., while opto-interrupter 37b may be a model OPB903W55. Opto-interrupter 37a generates a signal ("fires") when the light beam from its LED window 38a to its phototransistor window 39a is uninterrupted, whereas opto-interrupter 37b fires when its respective light beam is interrupted. Hence the signal of opto-interrupter 37a is inverted relative to opto-interrupter 37b.

The outputs of each of these opto-interrupters 37a,b is connected to a power control circuit 40 as shown in FIG. 4, which in turn regulates the number of power pulses conducted to the stepper motor 20. As is shown in FIGS. 1 and 4, the center line of the parallelly mounted opto-interrupters 37a,b is offset relative to the center line of the threaded shaft 11 for a purpose which will be explained shortly hereinafter.

The stepper motor 20 includes a drive nut 41 which is concentrically aligned with its axis of rotation and rotatably mounted near the bottom portion of the motor 20 as shown in FIG. 1. This drive nut 41 is engaged with the central threaded portion 43 of the shaft 11. In the preferred embodiment, the threaded portion 43 employs a relatively fine screw pitch (which may be, for example, 0.062 inches per rotation) whose screw threads have a substantially square profile, which is known in the art as an Acme screw thread. The fine pitch of this screw thread, in combination with such a square profile, creates a substantial frictional engagement between the threaded shaft 11 and the screw threads of the drive nut 41 which advantageously resists any tendency for the threaded shaft 11 to "backdrive" through the nut 41 when pressure on the valve element 13 applies an upwardly directed axial force to the shaft 11.

The bottom end 45 of the threaded shaft 11 includes screw threads (not shown) which are screwed into a threaded bore present in the spring guide 62 of the resilient linkage assembly 15. The top end 47 of the threaded shaft 11 includes a threaded bore (not shown) for receiving the bottom, threaded end (again not shown) of an opto-interrupter adjustment screw 49. The bottom end 51 of the shank of the opto-interrupter adjustment screw is deliberately fabricated to have a reduced diameter portion, while the top end of the adjustment screw 49 includes a screw head 53 with a slot 55 for receiving the blade of a screwdriver. This screw head 53 is contained within a short guide tube 57 which is screwed into a threaded opening present at the top of the motor housing 26. Finally, a bushing 58 is concentrically disposed around the top end of the bore 21 of the stepper motor 20 that accommodates the threaded shaft 11.

With reference again to FIG. 1, the resilient linkage assembly 15 includes a generally tubular shaped, spring retainer 60. The bottom end of the spring retainer 60 is integrally connected to the valve element 13, while the inner diameter of the top end includes screw threads 61 for receiving retaining nut 70. A generally cylindrical spring guide 62 is concentrically disposed within the tubular spring retainer 60. The spring guide 62 includes a stroke limiting shoulder 64 at its upper middle portion, and includes a threaded bore 66 at its upper end for receiving the screw threads located at the bottom end 45 of the threaded shaft 11. The previously referred-to retaining nut 70 includes a hexagonal head 71 and a threaded shank 73 whose bottom end engages the top of the stroke limiting shoulder 64 when the head of the nut 71 is screwed into engagement with the top end of the tubular spring retainer 60 as shown. Such screwing down of the retaining nut 70 advantageously pre-compresses the constant force helical spring 17 while at the same time defining a relatively short spring stroke S whose length is the distance between the bottom end of the spring guide 62, and the top surface of the valve element 13. To maximize the constant force characteristics of the spring 17, the length of the threaded shank 73 of the retaining nut 70 is chosen to define a spring stroke which is only a little larger than the maximum expected variation of the distance between the upper surface 98 of the valve seat 5, and the valve element 13 when the threaded shaft 11 assumes a valve closing position as a result of thermal expansion or contraction of the metal forming the cylindrical valve body 3, in addition to whatever dimensional variations may occur as a result of the inadvertent deposition of thin films over the top surface 98 of the valve seat 5. In the context of this specification, a constant force spring may be, for example, a spring whose compressive force characteristics vary less than 10% over the stroke of the spring.

The resilient linkage assembly 15 is circumscribed by guide sleeve 75 which projects down from the motor mounting plate 24. A teflon-coated steel bushing 77 is disposed between the inner diameter of the guide sleeve 75, and the outer diameter of the spring retainer 60 of the resilient linkage assembly 15 in order to minimize friction therebetween when the threaded shaft 11 reciprocably and slidably moves the resilient linkage assembly 15 along the axis of rotation of the guide sleeve 75.

A metallic, tubular bellows 79 completely surrounds and hermetically seals the resilient linkage assembly 15 from the interior portion of the cylindrical valve body 3 which will conduct gases during the operation of the valve in order to insure that any particulate matter generated by the moving parts of the linkage assembly 15 will not ultimately find their way into the vacuum system that the valve 1 forms a part of. The lower end of the bellows 79 circumscribes a flange 81 that extends from the upper side of the valve element 13, while the upper end of the bellows 79 is circumferentially connected to a bellows mounting plate 83 which defines the ceiling of the valve body 3. A sealing gasket 85 forms a gas tight seal between the outer edge of the bellows mounting plate 83, and an annular groove 87 in the inner diameter of the upper mounting flange 32 of the valve body 3. The bellows mounting plate 83 advantageously defines a vent path between the interior of the bellows 79 and the ambient atmosphere which is formed from an annular vent space 89 located around the inner diameter of the plate 83, and radially oriented vent spaces 91 defined between the upper surface of the bellows mounting plate 83, and the lower surface of the motor mounting plate 24. The bellows 79 advantageously biases the threaded shaft 11 against the threads of the drive nut 41 as a result of both spring-type mechanical spring forces that the pleats of the bellows 79 apply to the upper side of the valve element 13, as well as pneumatic forces created by the fact that the pressure within the bellows 79 is at ambient, while the pressure within the valve body 3 is typically below ambient or at near vacuum. The biasing forces that the bellows 79 applies between the threaded shaft 11 and the drive nut 41 advantageously prevent backlash from occurring between these two threaded components which could in turn cause the linear displacement of the threaded shaft 11 to disadvantageously vary with the number of rotations of the drive nut 41.

Figure 3:
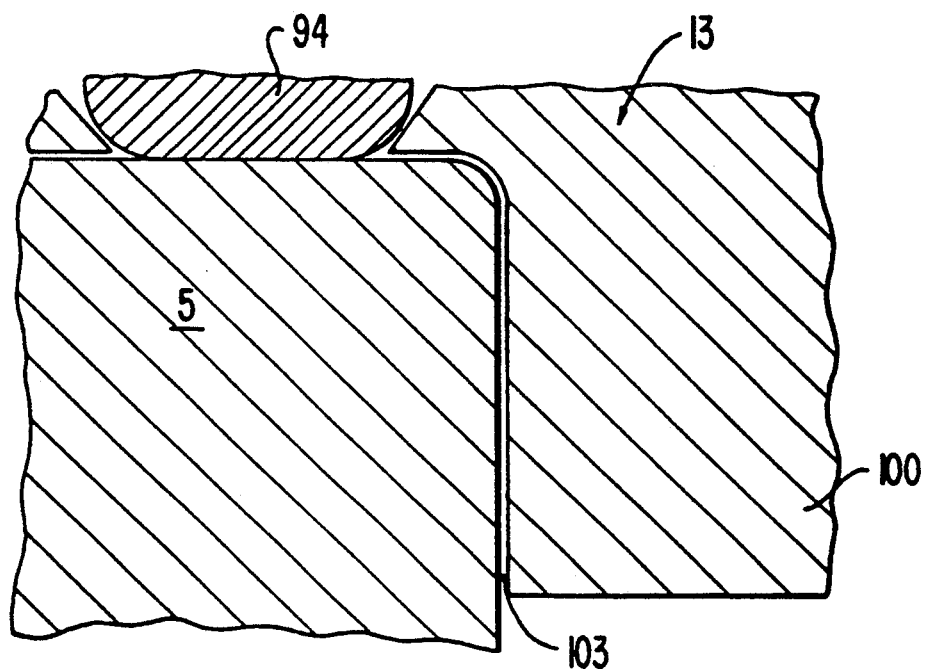
FIG. 3 is an enlargement of the valve seat and valve element circled in FIG. 2.

With reference now to FIGS. 1 and 3, the valve element 13 preferably includes an O-ring 94 formed from an elastomeric material which is disposed in an annular groove 96 which circumscribes the outer portion of valve element 13. The provision of such an O-ring in the valve element 13 advantageously provides positive, complete and reliable shut-off characteristics to the valve 1. While an O-ring 94 is used in this particular preferred embodiment, any sealing element (such as an elastomeric gasket or a copper seal of the type typically used in high vacuum applications) is within the scope of the invention. When the threaded shaft 11 is moved into a valve closing position by the stepper motor 20, the O-ring 94 sealingly engages a flat, annular surface 98 located on the top surface of the valve seat 5. The valve element 13 is further provided with a cylindrical nose piece 100 which is substantially complementary in shape to the cylindrical inner diameter 102 of the valve seat 5, but spread apart from the diameter by a thin annular space 103.

Figure 2:
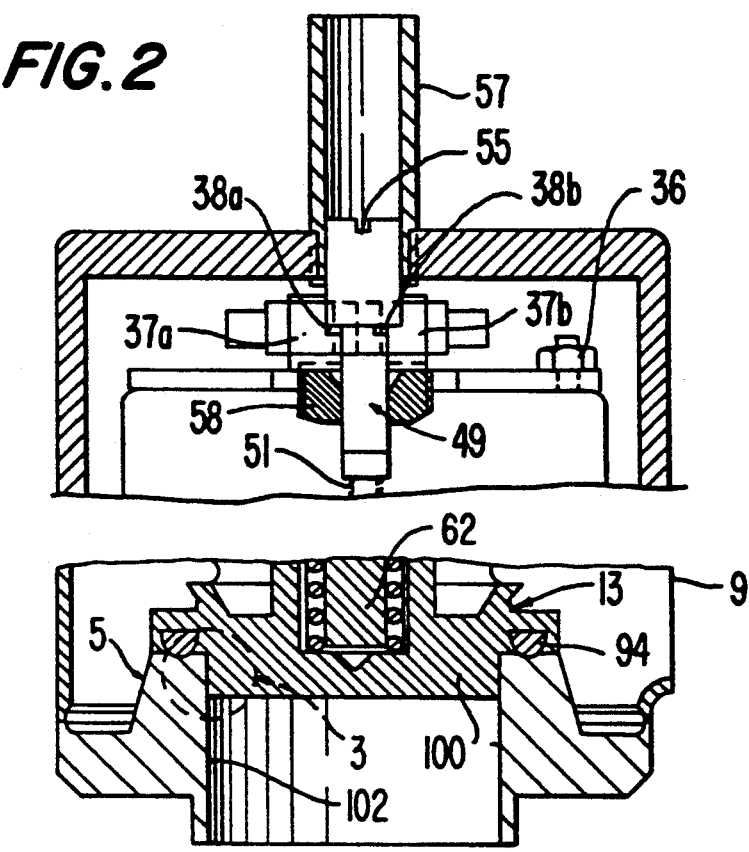
FIG. 2 is a partial cross-sectional side view of the valve shown in FIG. 1, illustrating this valve in a closed condition.

In operation, when the threaded shaft 11 assumes the valve opening position illustrated in FIG. 1, neither of the beams of the opto-interrupters 37a,b is interrupted by any portion of the adjustment screw 49. Because the outputs of the opto-interrupters 37a,b are inverted relative to one another, 37a generates no signal at the valve opening position, while 37b generates a firing signal. The power control circuit 40 is programmed to cease sending pulses of power to the stepper motor 20 upon receipt of a firing signal from one of the opto-interrupters 37a,b. When the operator of the valve 1 overrides the "cease power" output of the power control circuit 40 to extend the threaded shaft 11 into a valve closing position, the drive nut 41 of the stepper motor 20 continues to move the valve element 13 down toward the valve seat 5. Because of the offset relationship between the shank of the adjustment screw 49 and the interface 37.5 of the opto-interrupters 37a,b, the light beam of 37a remains uninterrupted, while the beam of 37b is interrupted. Thus neither opto-interrupter "fires", and the motor 20 is free to rotate until the lower portion of the screw head 53 interrupts the beams of both of the opto-interrupters 37a,b as is shown in FIG. 2, at which time opto-interrupter 37b generates a firing signal that causes the power control circuit 40 to cease transmitting power to the motor 20. At this juncture, the O-ring 94 of the valve element 13 is compressed against the flat, annular surface 98 of the valve seat 5 in the position illustrated in both FIGS. 2 and 3. As has been indicated previously, the extent to which the bottom end of the adjustment screw 49 of the opto-interrupter assembly 33 can be screwed into the top end 47 of the threaded shaft 11 is variable due to the presence of screw threads (not shown) extending from the bottom portion of the small end 51 of the screw 49. In the preferred method of operating the valve 1, the adjustment screw 49 is screwed into the top end 47 of the threaded shank 11 to an extent such that when the O-ring 94 engages the flat annular surface 98 of the valve seat 5, the spring 17 will be compressed a distance of ½ of its stroke S (as may be seen by comparing the distance between the bottom end 55 of the spring guide 62 and the upper surface of the valve element 13 in FIGS. 1 and 2). The adjustment of the screw 49 in the aforementioned manner allows the resilient linkage assembly 15 to depress the valve element 13 against the valve seat 5 with substantially the same force whether the valve body 3 of the valve 1 expands or contracts in response to ambient temperature conditions, or whether the valve seat 5 becomes inadvertently coated with a film of material.

When the operator of the valve 1 wishes to open the valve pursuant to either a slow start or a throttling operation, he may raise the valve element 13 with respect to the valve seat 5 with extreme precision by utilizing the power control circuit 40 to regulate the number of pulses of power transmitted to the stepper motor 20. As the drive nut 41 of the stepper motor 20 begins to incrementally withdraw the valve element 13 from the valve seat 5 to an extent where the O-ring 94 is lifted into non-sealing engagement with the annular surface 98, the amount of gas flow conducted by the valve 1 becomes a function of the height h of the annular space 103 (FIG. 3) defined between the outer diameter of the nose piece 100, and the inner diameter of the valve seat 102. When the operator of the valve wishes to completely open the valve 1, the power control circuit 40 continues to apply power pulses to the stepper motor 20 until small end 51 of the adjustment screw 49 allows both of the opto-interrupters 37a,b to transmit their beams to their respective phototransistors in an uninterrupted state, whereupon the power control circuit 40 will cease transmitting power pulses to the stepper motor 20, as previously described.

It should be noted that the offset relationship between the center line of the adjustment screw 49 and the mechanical interface of the two opto-interrupters 37a,b, in combination with the use of opto-interrupters that produce complementary signals form the equivalent of a simple, reliable "and" type control gate which in turn allows the use of a very simple power control circuit 40.

I claim:

1. A motor controlled poppet valve for controlling a flow of gas of the type including a valve body, a valve seat, and a valve element, comprising:

a threaded shaft driven by an electric stepper motor and having a free end reciprocally movable into a valve closing and a valve opening position, said valve closing position corresponding to a substantially nonvarying distance between said shaft free end and said motor, and a resilient linkage assembly interconnecting said free end of said shaft with said valve element which includes a constant force spring, and a spring retainer for retaining the spring in a pre-compressed state to enhance the constant force characteristics thereof and for defining the stroke of the constant free spring, for forcibly depressing said valve element in sealing engagement with said valve seat when said shaft is moved into said valve closing position with a force that remains substantially constant to provide gas throttling and soft pump capabilities for said valve regardless of variations in the distance between the free end of the shaft and the valve seat caused by thermal expansion and contraction of said valve body or deposition of a film onto the valve seat.

2. A motor controlled poppet valve of the type defined in claim 1, wherein said shaft is threaded, and wherein said stepper motor rotates a stationary drive means that threadedly engages said shaft to reciprocably move said shaft.

3. A motor controlled poppet valve of the type defined in claim 2, wherein the threaded engagement between the shaft and the drive means causes most of the torque generated by the motor means to be dissipated in overcoming the frictional forces between said shaft threads and drive means to prevent backdrive of the threaded shaft with respect to the drive means.

4. A motor controlled poppet valve of the type defined in claim 2, further comprising a means for applying a biasing force between the threads of said shaft and said drive means to prevent backlash.

5. A motor controlled poppet valve of the type defined in claim 4, wherein said biasing means includes a bellows means that further functions to contain and isolate said resilient linkage assembly.

6. A motor controlled poppet valve of the type defined in claim 1, further comprising a bellows means for containing and isolating said resilient linkage assembly within said valve body.

7. A motor controlled poppet valve of the type defined in claim 1, wherein said valve element includes a sealing element, and a member that is substantially complementary in shape to at least a portion of said valve seat to provide throttling and soft pump capabilities for said valve.

8. A motor controlled poppet valve of the type defined in claim 1, further comprising an optical switching circuit for deactivating said electric stepper motor when said shaft is moved into said valve closing position.

9. A motor controlled poppet valve of the type defined in claim 8, wherein said optical switching circuit is an opto-interrupter that optically communicates with said shaft.

10. A motor controlled poppet valve of the type defined in claim 9, further comprising a means for adjusting the distance between the free end of the shaft and said motor that corresponds to said valve closing position, wherein said adjusting means includes a screw means engaged to said threaded shaft for changing the position of the portion of the shaft that said opto-interrupter interacts with.

11. A motor controlled poppet valve of the type defined in claim 1, further comprising a means for adjusting the distance between the free end of the shaft and said motor that corresponds to said valve closing position.

12. A motor controlled poppet valve for controlling a flow of gas of the type including a valve body, a valve seat mounted in one end of the valve body, a valve element having a resilient sealing member, comprising:
   a rotatable, threaded shaft having a free end reciprocally movable into a valve opening and a valve closing position, said valve closing position corresponding to a substantially nonvarying distance between said shaft free end and said motor;
   a stepper motor mounted in another end of the valve body for driving a nut that is threadedly engaged to said shaft to reciprocally move said shaft, and
   a resilient linkage assembly interconnecting said free end of said shaft with said valve element which includes a constant force spring, and a spring retainer for retaining the spring in a pre-compressed state to enhance the constant force characteristics thereof for forcibly depressing said resilient sealing member into sealing engagement with said valve seat when said shaft is in said valve closing position with a force that remains substantially constant to provide gas throttling and soft pump capabilities for said valve regardless of variations in the distance between the free end of said shaft in said valve closing position and said valve seat due to thermal expansion and contraction of said valve body or deposition of a film onto the valve seat caused by thermal expansion and contraction of said valve body or deposition of a film onto the valve seat.

13. A motor controlled poppet valve of the type defined in claim 12, wherein the resilient linkage assembly is compressible over a distance d with respect to the axis of rotation of said shaft which is greater than the maximum variation in the distance between the free shaft end and the valve seat due to thermal expansion and contraction of said valve body.

14. A motor controlled poppet valve of the type defined in claim 12, further comprising a bellows means for containing and isolating said resilient linkage assembly within said valve body.

15. A motor controlled poppet valve of the type defined in claim 14, further comprising a means for applying a biasing force between the threads of said shaft and said drive means to prevent backlash.

16. A motor controlled poppet valve of the type defined in claim 12, wherein said valve element further includes a means for providing throttling and soft pump capabilities for said valve.

17. A motor controlled poppet valve of the type defined in claim 16, wherein said throttling and soft pump means includes a member that projects down into the valve seat and which is substantially complementary in shape to said seat.

18. A motor controlled poppet valve of the type defined in claim 17, wherein said resilient sealing member of said valve element includes an O ring, and said projecting member is disposed around said O ring.

19. A motor controlled poppet valve of the type defined in claim 12, wherein the threaded engagement between the shaft and the nut causes most of the torque generated by the stepper motor to be dissipated in overcoming frictional forces such that backdrive of the threaded shaft with respect to said nut is prevented.

20. A motor controlled poppet valve of the type defined in claim 12, further comprising a power control circuit for controlling the number of electrical power pulses to the stepper motor, and a pair of opto-interrupters mechanically connected in parallel which electrically communicate with the power control circuit and optically communicate with an end of the threaded shaft to stop and start the stopper motor when said threaded shaft is in said valve opening and valve closing positions.

21. A motor controlled poppet valve for regulating a flow of gas of the type including a motor, a valve body, a valve seat, and a valve element, comprising:
   a threaded shaft driven by said motor by means of a rotating nut and having a free end reciprocally movable into a valve closing and a valve opening position, said valve closing position corresponding to a substantially nonvarying distance between said shaft free end and said motor, and
   a resilient linkage assembly interconnecting said free end of said shaft with said valve element which includes a constant force spring, and a spring retainer for retaining the spring in a pre-compressed state that enhances the constant force characteristics of the spring for forcibly depressing said valve element in sealing engagement with said valve seat when said shaft is moved into said valve closing position with a force that remains substantially constant to provide throttling and soft pump capabilities for said valve regardless of variations in the distance between the free end of the shaft and the valve seat due to thermal expansion and contraction of said valve body or deposition of a film onto the valve seat.

* * * * *